US011999340B2

(12) United States Patent
Okuda et al.

(10) Patent No.: US 11,999,340 B2
(45) Date of Patent: Jun. 4, 2024

(54) VEHICLE CONTROL DEVICE, VEHICLE CONTROL METHOD, AND PROGRAM FOR CAUSING COMPUTER TO IMPLEMENT VEHICLE CONTROL FUNCTION

(71) Applicant: TOYOTA JIDOSHA KABUSHIKI KAISHA, Toyota (JP)

(72) Inventors: Koichi Okuda, Toyota (JP); Masafumi Yamamoto, Nagakute (JP); Yoshito Sekiguchi, Kariya (JP); Yuuki Makino, Aichi-gun (JP); Atsushi Tabata, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/332,131

(22) Filed: Jun. 9, 2023

(65) Prior Publication Data
US 2023/0415724 A1 Dec. 28, 2023

(30) Foreign Application Priority Data
Jun. 22, 2022 (JP) .................................. 2022-100710

(51) Int. Cl.
*B60W 10/115* (2012.01)
*B60W 30/165* (2020.01)
*G08G 1/00* (2006.01)

(52) U.S. Cl.
CPC ........ *B60W 10/115* (2013.01); *B60W 30/165* (2013.01); *G08G 1/22* (2013.01); *B60W 2510/1005* (2013.01); *B60W 2510/1055* (2013.01); *B60W 2554/80* (2020.02); *B60W 2556/65* (2020.02)

(58) Field of Classification Search
CPC ............ B60W 10/115; B60W 30/165; B60W 2556/65; B60W 2554/80; B60W 2510/1005; B60W 2510/1055; G08G 1/22
See application file for complete search history.

(56) References Cited

U.S. PATENT DOCUMENTS

2013/0144502 A1* 6/2013 Shida ................. B60K 31/0008
701/96
2021/0264794 A1* 8/2021 Merwaday ............ B60W 30/16

FOREIGN PATENT DOCUMENTS

JP 2000-303868 A 10/2000

* cited by examiner

*Primary Examiner* — Huan Le
(74) *Attorney, Agent, or Firm* — Oblon, McClelland, Maier & Neustadt, L.L.P.

(57) ABSTRACT

A vehicle control device for controlling platooning of platoon participating vehicles by connecting the platoon participating vehicles to one another via radio communication, the platoon participating vehicles include a lead vehicle and follow-up vehicles that perform automatic follow-up running in line at a predetermined intervehicle distance from the lead vehicle, the device comprises a control portion that, during execution of the platooning, sets a permissible output range of a drive amount with a current gear ratio of an automatic transmission remaining kept, as a change characteristic of the drive amount in each of the platoon participating vehicles so that change of the drive amount in response to change of a drive demand amount lies within a predetermined range, the automatic transmission being included in each of the platoon participating vehicles to transmit power of a power source to driving wheels.

5 Claims, 10 Drawing Sheets

FIG.4

|      | C1  | C2  | C3  | B1  | B2  | F1  |
|------|-----|-----|-----|-----|-----|-----|
| 1st  | ○   |     |     |     | (○) | ○   |
| 2nd  | ○   |     |     | ○   |     |     |
| 3rd  | ○   | ○   |     |     |     |     |
| 4th  |     | ○   |     | ○   |     |     |
| Rev  |     |     | ○   |     | ○   |     |
| N    |     |     |     |     |     |     |

(○:ENGAGED  BLANK:RELEASED)

VEHICLE CONTROL DEVICE, VEHICLE CONTROL METHOD, AND PROGRAM FOR CAUSING COMPUTER TO IMPLEMENT VEHICLE CONTROL FUNCTION

BACKGROUND OF THE INVENTION

This application claims priority from Japanese Patent Application No. 2022-100710 filed on Jun. 22, 2022, the disclosure of which is herein incorporated by reference in its entirety.

Field of the Invention

The present invention relates to a technique for controlling platooning of platoon participating vehicles that include a lead vehicle and follow-up vehicles.

Description of the Related Art

A technique has been well known that controls platooning of platoon participating vehicles by connecting the platoon participating vehicles to one another via radio communication, the platoon participating vehicles including a lead vehicle and follow-up vehicles that perform automatic follow-up running in line at a predetermined intervehicle distance from the lead vehicle. An example thereof is a control device for platooning vehicles described in JP2000303868A. It is disclosed in JP2000303868A to render increase in the shift ratio (called also gear ratio) of the automatic transmission of the lead vehicle difficult as compared with the follow-up vehicles.

By the way, in the vehicle drive control including shift control shifting the automatic transmission, the drive amount change characteristic may differ among the platoon participating vehicles. In this case, if the drive amount is changed in accordance with the change of the drive demand amount, difference in vehicle velocity occurs among the platoon participating vehicles, so that the intervehicle distance may vary.

SUMMARY OF THE INVENTION

The object indicated above is achieved according to the following aspects of the present invention.

The present invention was conceived in view of the above circumstances, and an object thereof is to provide a vehicle control device, a vehicle control method, and a program for causing a computer to implement a vehicle control function, capable of suppressing change of intervehicle distance attributable to difference in drive amount change characteristic among the platoon participating vehicles.

According to a first aspect of the invention, a vehicle control device for controlling platooning of platoon participating vehicles by connecting the platoon participating vehicles to one another via radio communication, the platoon participating vehicles include (a) a lead vehicle and follow-up vehicles that perform automatic follow-up running in line at a predetermined intervehicle distance from the lead vehicle, the vehicle control device includes (b) a control portion that, during execution of the platooning, sets a permissible output range of a drive amount with a current gear ratio of an automatic transmission remaining kept, as a change characteristic of the drive amount in each of the platoon participating vehicles so that change of the drive amount in response to change of a drive demand amount lies within a predetermined range, the automatic transmission being included in each of the platoon participating vehicles to transmit power of a power source to driving wheels.

According to a second aspect of the invention, in the vehicle control device of the first aspect of the invention, the control portion sets, as the predetermined range, a narrowest range among ranges of the drive amount outputtable at the current gear ratio of the automatic transmission in the platoon participating vehicles.

According to a third aspect of the invention, in the vehicle control device of the first aspect of the invention, the control portion sets, as the change characteristic of the drive amount, an upper limit value of a change rate of the drive amount that is restricted when a drive device of each of the platoon participating vehicles switches from a driven state to a driving state.

According to a fourth aspect of the invention, in the vehicle control device of the third aspect of the invention, the control portion sets, as the predetermined range, a lowest value among upper limit values of the change rate of the drive amount in the platoon participating vehicles.

According to a fifth aspect of the invention, according to any one of the first through fourth aspect of the invention, during execution of the platooning, the control portion sets a shift schedule in stepped shifting of the automatic transmission so that the range of the drive amount outputtable is easily maintained.

According to a sixth aspect of the invention, in the vehicle control device of the fifth aspect of the invention, during execution of the platooning, the control portion sets a shift schedule rendering the stepped shifting of the automatic transmission difficult as compared with time of non-execution of the platooning.

According to a seventh aspect of the invention, in the vehicle control device of the sixth aspect of the invention, the rendering the stepped shifting difficult is rendering upshifting of the automatic transmission difficult.

According to an eighth aspect of the invention, there is provided a vehicle control method for controlling platooning of platoon participating vehicles by connecting the platoon participating vehicles to one another via radio communication, the platoon participating vehicles include (a) a lead vehicle and follow-up vehicles that perform automatic follow-up running in line at a predetermined intervehicle distance from the lead vehicle, the method comprises (b) a control step of, during execution of the platooning, setting a permissible output range of a drive amount with a current gear ratio of an automatic transmission remaining kept, as a change characteristic of the drive amount in each of the platoon participating vehicles so that change of the drive amount in response to change of a drive demand amount lies within a predetermined range, the automatic transmission being included in each of the platoon participating vehicles to transmit power of a power source to driving wheels.

According to a ninth aspect of the invention, there is provided a program which is configured to cause a computer to implement a vehicle control function for controlling platooning of platoon participating vehicles by connecting the platoon participating vehicles to one another via radio communication, the platoon participating vehicles include (a) a lead vehicle and follow-up vehicles that perform automatic follow-up running in line at a predetermined intervehicle distance from the lead vehicle, (b) the vehicle control function comprises a control function of, during execution of the platooning, setting a permissible output range of a drive amount with a current gear ratio of an automatic transmission remaining kept, as a change characteristic of the drive amount in each of the platoon participating vehicles so that change of the drive amount in response to change of a drive demand amount lies within a predetermined range, the automatic transmission being included in each of the platoon participating vehicles to transmit power of a power source to driving wheels.

ADVANTAGEOUS EFFECT OF THE INVENTION

According to the first aspect of the invention, in the platoon participating vehicles including a lead vehicle and follow-up vehicles connected to each other via radio communication, during execution of platooning, the permissible output range of the driving torque with the current gear stage of the shift portion kept is set as the change characteristic of the driving torque in each of the platoon participating vehicles so that the change of the driving torque in response to the change of the demanded driving torque lies within the predetermined range, to thereby restrain difference in the vehicle velocity from occurring among the platoon participating vehicles when changing the driving torque in accordance with the change of the demanded driving torque. It is also possible to suppress the change of the vehicle velocity arising from shifting when changing the driving torque in accordance with the change of the demanded driving torque, thereby properly restraining difference in the vehicle velocity from occurring among the platoon participating vehicles. It is thus possible to suppress the change of the intervehicle distance caused by the difference in the change characteristic of the driving torque among the platoon participating vehicles.

According to the second aspect of the invention, the restriction range of the driving torque as the predetermined range is the narrowest range among ranges of the driving torque outputtable at the current gear stage of the shift portions in the platoon participating vehicles, consequently enabling proper suppression of change of the intervehicle distance attributable to difference in the change characteristic of the driving torque among the platoon participating vehicles.

According to the third aspect of the invention, the tip-in torque rate in each of the platoon participating vehicles is set as the change characteristic of the driving torque, consequently enabling suppression of variance of the tip-in torque rate among the platoon participating vehicles. This allows the occurrence of difference in the vehicle velocity among the platoon participating vehicles to be properly suppressed.

According to the fourth aspect of the invention, the lowest value of the tip-in torque rates in the platoon participating vehicles is employed as the restriction value of the change rate of the driving torque as the predetermined range, consequently enabling proper suppression of change of the intervehicle distance attributable to difference in the change characteristic of the driving torque among the platoon participating vehicles.

According to the fifth aspect of the invention, during execution of platooning, the shift schedule in the stepped shifting of the shift portion is set so that the outputtable range of driving torque is easily maintained, thus achieving improved control degree of freedom of the driving torque for the change of the demanded driving torque. This leads to proper suppression of the occurrence of difference in the vehicle velocity among the platoon participating vehicles.

According to the sixth aspect of the invention, during execution of platooning, the shift schedule of the shift portion is set that renders stepped shifting of the shift portion difficult as compared with the time of non-execution of platooning, with the result that it is possible to properly suppress the change of the vehicle velocity attributable to shifting when changing the driving torque in accordance with change of the demanded driving torque.

According to the seventh aspect of the invention, "renders stepped shifting of the shift portion difficult" means rendering upshifting of the shift portion difficult, whereupon it is possible to properly suppress the change of the vehicle velocity attributable to shifting while maintaining the outputtable range of the driving torque.

According to the eighth aspect and the ninth aspect of the present invention, during execution of platooning, the permissible output range of the drive amount with the current gear ratio of the automatic transmission of each of the platoon participating vehicles remaining kept is set as the change characteristic of the drive amount in each of the platoon participating vehicles so that the change of the drive amount in response to the change of the drive demand amount lies within the predetermined range, to thereby restrain difference in the vehicle velocity from occurring among the platoon participating vehicles when changing the drive amount in accordance with the change of the drive demand amount. It is also possible to suppress the change of the vehicle velocity arising from shifting when changing the drive amount in accordance with the change of the drive demand amount, thereby properly restraining difference in the vehicle velocity from occurring among the platoon participating vehicles. It is thus possible to suppress the change of the intervehicle distance caused by the difference in the change characteristic of the drive amount among the platoon participating vehicles.

BRIEF DESCRIPTION OF THE DRAWINGS

FIG. 4 is an operation engagement table showing relationships between a plurality of gear stages of a shift portion disposed in the power transmission device for HEV of FIG. 3 and control states of engagement devices for establishing the gear stages;

DESCRIPTION OF THE PREFERRED EMBODIMENTS

Figure 1:
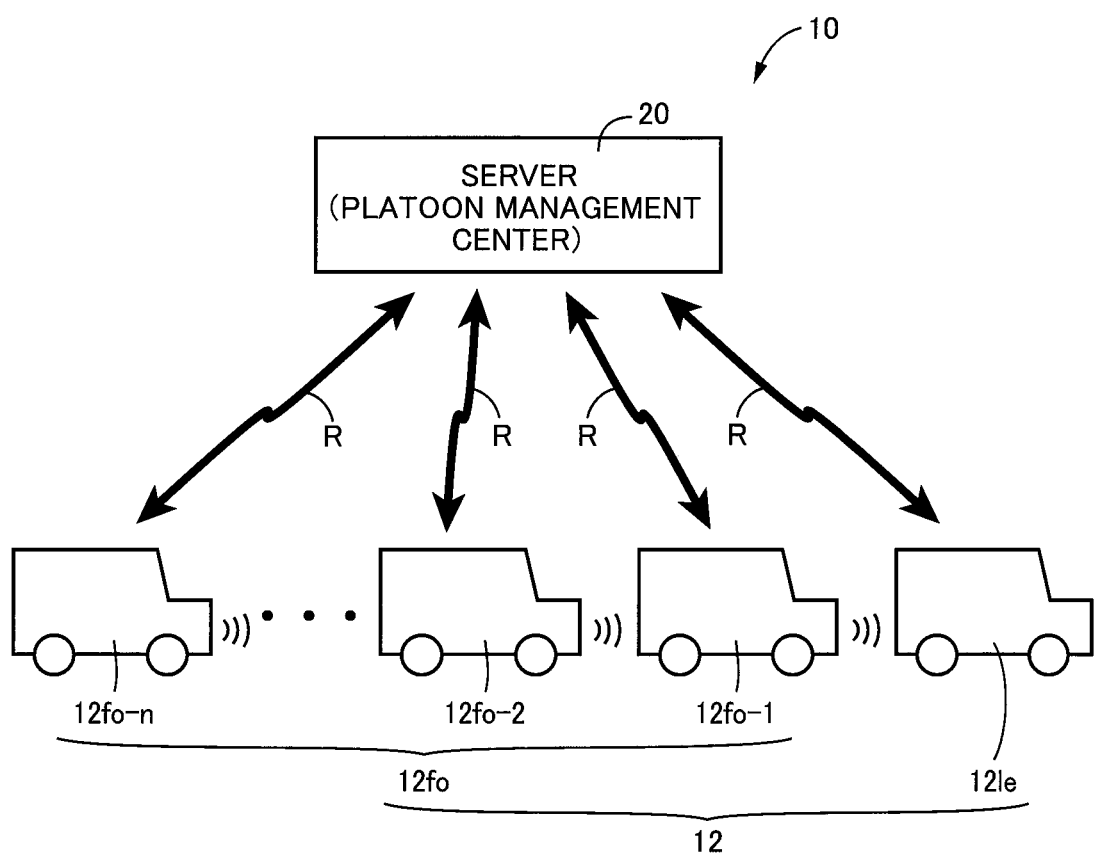
FIG. 1 is a schematic view explaining a basic configuration of a platooning system that is an embodiment of the present invention.

In embodiments of the present invention, the first, eighth, and ninth aspects of the invention are aspects having substantially the same features. Accordingly, constituent requirements described in each of the second to seventh aspects can be cited from the eighth and ninth aspects as well as the first aspect.

The platoon participating vehicles are traditionally used various types of vehicles such as e.g. an engine-driven vehicle, an electric automobile, or a hybrid electromotive vehicle having an engine and a rotator as the power source. The engine is an internal combustion engine such as e.g. a gasoline engine or a diesel engine. The rotator is a motor generator that can be used selectively as an electric motor or a power generator. The motor generator functions as the power source by being used as the electric motor and can impart regenerative braking by being used as the power generator. The rotator may be an electric motor not having the function as the power generator.

A hydrodynamic power transmission device such as a torque converter is disposed as needed on a power transmission path between the power source and the automatic transmission. The hydrodynamic power transmission device may be left out depending on the power source. For example, on the power transmission path between the power source and the automatic transmission, there may be disposed an electric differential portion with planetary gear drive and differential control rotator, a friction-engagement starting clutch, etc. The automatic transmission is a stepped transmission of e.g. planetary gear type, biaxial meshing type, etc., but may be a continuously variable transmission of belt type, etc. having a stepwise controlled gear ratio like the stepped transmission.

The vehicle control devices are control devices used for vehicles. All or some of the vehicle control devices can be built in servers disposed in e.g. a head office, sales offices, or any other places of a transport company or the like that manages the platoon participating vehicles. All or some of the vehicle control devices may be mounted on e.g. the platoon participating vehicles, or some of control functions such as shift control shifting the automatic transmission may be incorporated in in-vehicle control devices. The platoon participating vehicles are configured including e.g. one lead vehicle and a plurality of follow-up vehicles. The platoon participating vehicles may consist of e.g. a total of two vehicles i.e. one lead vehicle and one follow-up vehicle. Running by the platoon participating vehicles enables manned running in which a vehicle runs with the driver on board and unmanned running in which a vehicle runs without the driver on board by using e.g. an automatic steering system that allows running along a previously defined running route. Control of the platooning by the vehicle control devices may be carried out via radio communication between the server and each of the platoon participating vehicle, or may be performed via radio communication e.g. vehicle-to-vehicle communication between the platoon participating vehicles.

The vehicle control device may be a control device that controls two or more of the platoon participating vehicles or may be a control device that controls a single of the platoon participating vehicle. In the case where the vehicle control device is a control device that controls a single vehicle, for example, the vehicle control devices controlling corresponding platoon participating vehicles cooperate to effect the platooning control. Accordingly, all or some of the vehicle control devices may be mounted on any platoon participating vehicles manufactured by different vehicle manufacturers.

The vehicle control method is a control method for use in vehicles. That is, the vehicle control method is applicable to the platoon participating vehicles. The vehicle control method may be a control method that controls two or more of the platoon participating vehicles or may be a control device that controls a single of the platoon participating vehicle. The vehicle control method is applicable to any platoon participating vehicles manufactured by different vehicle manufacturers.

The program for causing the computer to implement the vehicle control functions is a program for causing the computer to implement control functions for use in vehicles, executed by the vehicle control device. That is, the program can run for the platoon participating vehicles. The program may be a program that controls two or more of the platoon participating vehicles or may be a program that controls a single of the platoon participating vehicle. The program can run for any platoon participating vehicles manufactured by different vehicle manufacturers. The computer is configured to include a so-called microcomputer, etc. similar to that in the vehicle control device. The computer can execute e.g. the program stored in advance. The computer can execute the program by reading the program previously recorded in a record medium. The record medium is a medium that can record the program, such as e.g. a storage device such as an optical disk, a hard disk drive, or the like, or a nonvolatile memory such as a flush memory. The computer can execute the program by downloading the program through communication.

The follow-up vehicle has a function of follow-up running at a predetermined intervehicle distance. That is, the vehicle control device, the vehicle control method, and the program for causing the computer to implement the vehicle control functions figure out a drive demand amount necessary for the follow-up running keeping the intervehicle distance between the follow-up vehicle and the preceding vehicle at a previously defined target intervehicle distance, and controls the output of the power source to obtain the drive demand amount, to thereby execute the follow-up running control that allows follow-up running with the target intervehicle distance. It is desirable that the lead vehicle can execute not only the follow-up running control but also autonomous running control that allows running at a predetermined target vehicle velocity, by calculating a drive demand amount necessary for running at a previously defined target vehicle velocity and controlling the output of the power source to obtain the drive demand amount. The autonomous running control may be control for constant velocity running that runs at a constant target vehicle velocity, or may be control for automatically running while varying the vehicle velocity depending on the target vehicle velocity that is sequentially variably set along the running route. The follow-up vehicle may also be capable of executing autonomous running control, similar to the lead vehicle. That is, there is no need to functionally distinguish the lead vehicle from the follow-up vehicle, and it is desirable to enable optional participation in a platoon as the lead vehicle or the follow-up vehicle. The output control of the power source in the follow-up running control and the autonomous running control is desirably effected including negative torque that arises from e.g. the engine braking or regenerative control of the rotator, and the braking force control may be effected via the automatic braking system. The lead vehicle may run controlling the output of the power source depending on the driver's acceleration/deceleration operation. Although also in the lead vehicle, shifting of the automatic transmission is managed by each of the vehicle control device, the vehicle control method, and the program for causing the computer to implement the vehicle control functions, for example, a guide vehicle or the like shifting the automatic transmission depending on the manual operation may be arranged in front of the lead vehicle.

The platoon participating vehicles may include plural types of vehicles having respective automatic transmissions differing in the number of gear stages, but may include only vehicles having one type of automatic transmissions with the same number of gear stages. At the time of platooning, the platoon participating vehicles need not necessarily have a shift schedule set for platooning, and may apply a shift schedule for solo running intactly to platooning.

The gear ratio of the automatic transmission is "input rotary member rotation number/output rotary member rotation number". The high gear ratio of the automatic transmission is a high vehicle velocity gear ratio with smaller gear ratio. The low gear ratio of the automatic transmission is a low vehicle velocity gear ratio with larger gear ratio. For example, the lowest gear ratio is a lowest vehicle velocity gear ratio on the lowest vehicle velocity side, and is a maximum gear ratio with largest gear ratio.

An embodiment of the present invention will now be described in detail with reference to the drawings.

Embodiment

FIG. 1 is a schematic view explaining a basic configuration of a platooning system 10 that is an embodiment of the present invention. In FIG. 1, the platooning system 10 is configured including platoon participating vehicles 12 and a server 20 acting as a platoon management center. Such platooning is performed mainly on e.g. freeways or other automobile-only roads.

The platoon participating vehicles 12 include a plurality of platoon participating vehicles $12_{le}$, $12_{fo-1}$, $12_{fo-2}$, . . . , and $12_{fo-n}$. The platoon participating vehicle $12_{le}$ is a lead vehicle of the platoon. The platoon participating vehicles $12_{fo-1}$, $12_{fo-2}$, . . . , and $12_{fo-n}$ are follow-up vehicles that automatically follow the lead vehicle $12_{le}$ in line at a predetermined intervehicle distance, with reference numerals $12_{fo-1}$, $12_{fo-2}$, . . . , and $12_{fo-n}$ being imparted to the follow-up vehicles in order from the leading side. In this embodiment, when not particularly distinguished, the platoon participating vehicles $12_{fo-1}$, $12_{fo-2}$, . . . , and $12_{fo-n}$ are referred to as follow-up vehicles $12_{fo}$, and the lead vehicle $12_{le}$ and the follow-up vehicles $12_{fo}$ are referred to as platoon participating vehicles 12. The server 20 is, for example, an electronic control device such as a personal computer. For example, the server 20 may be disposed in a head office, sales offices, etc. of a company to which the platoon participating vehicles 12 belong, or may be disposed in commercial facilities, etc.

Figure 2:
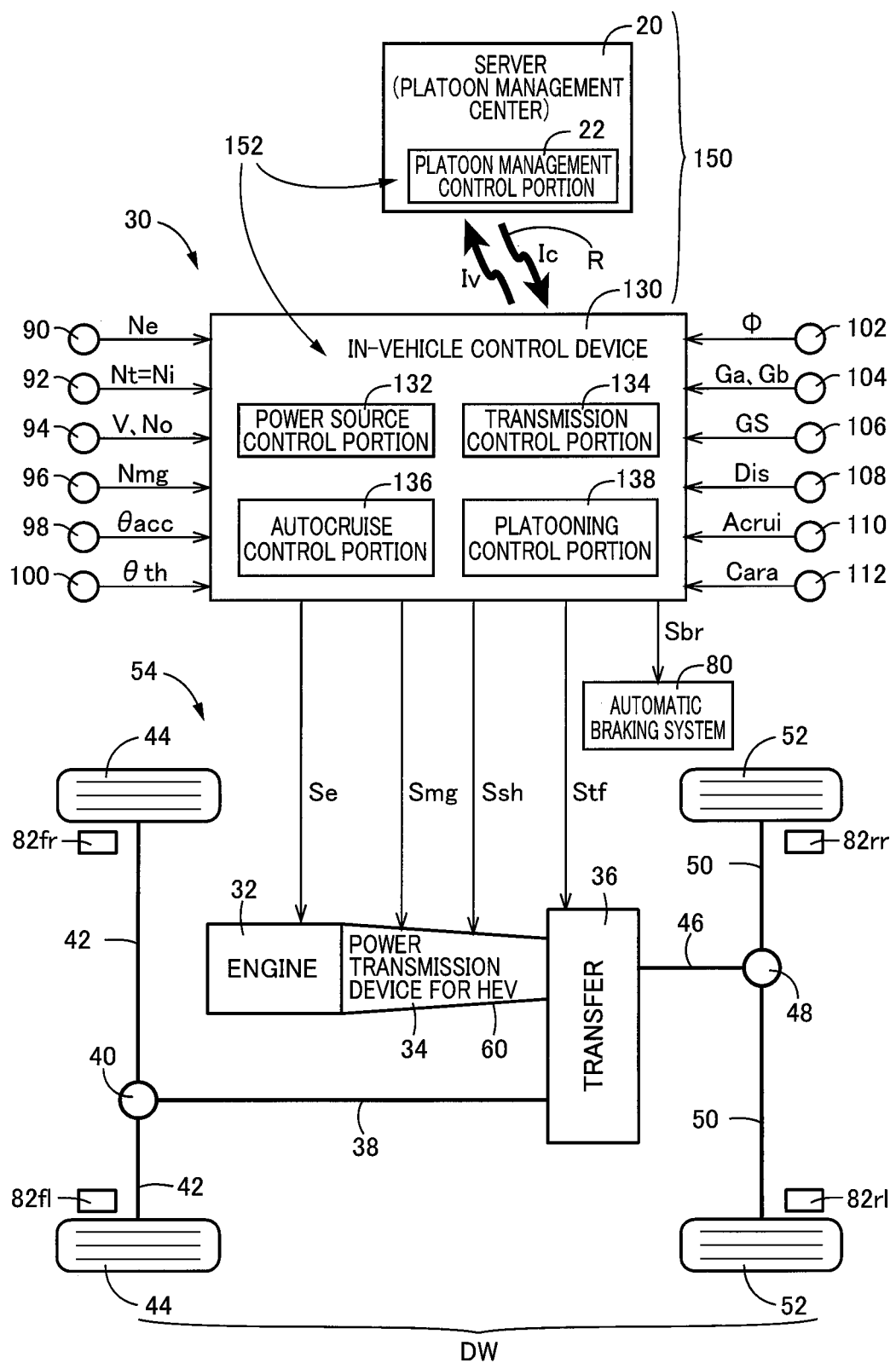
FIG. 2 is a diagram explaining an example of a vehicle that is usable as a platoon participating vehicle of FIG. 1, and is a diagram showing control functions for various controls and a principal part of a control system, together with a schematic view of a drive system.

FIG. 2 is a diagram explaining an example of a vehicle 30 that can join a platoon as a platoon participating vehicle 12 of FIG. 1, and is a diagram showing control functions for various controls and a principal part of a control system, together with a schematic view of a drive system. In FIG. 2, the vehicle 30 is an ordinary vehicle capable of not only platooning but also solo running, and includes an in-vehicle control device 130 that is an in-vehicle electronic control device. In the case where the vehicles 30 join a platoon as the platoon participating vehicles 12, the in-vehicle control device 130 of each platoon participating vehicle 12 and the server 20 are connected to each other via a radio communication R network such as mobile phone network, wireless LAN network, or the Internet (see FIG. 1), enabling interchange of various pieces of information therebetween. In the case where the vehicles 30 join a platoon as the platoon participating vehicles 12, they may be connected to each other via radio communication e.g. vehicle-to-vehicle communication between the platoon participating vehicles 12.

The in-vehicle control devices 130 and the server 20 are each configured to include a so-called microcomputer having a CPU, a RAM, a ROM, an I/O interface, etc., the CPU performing various types of signal processing in accordance with a program previously stored in the ROM while utilizing the temporary storage function of the RAM, so that the CPU can execute various controls. The in-vehicle control devices 130 and the server 20 are vehicle control devices 150 connecting the platoon participating vehicles 12 to each other via the radio communication R, to control platooning of the platoon participating vehicles 12.

The vehicle 30 is a front and rear wheel drive i.e. four-wheel drive hybrid electromotive vehicle based on a front engine rear wheel (FR) drive system. The vehicle 30 includes an engine 32, a power transmission device 34 for hybrid electric vehicle (HEV) coupled to the engine 32, and a transfer 36 coupled to the power transmission device 34 for HEV. A front propeller shaft 38 and a rear propeller shaft 46 are each connected to the transfer 36. Power transmitted from the engine 32 and the power transmission device 34 for REV to the transfer 36 is distributed via the transfer 36 to the front propeller shaft 38 and the rear propeller shaft 46. Power distributed to the front propeller shaft 38 is transmitted via a front-wheel-side differential gear 40 and left and right front-wheel drive shafts 42 to left and right front wheels 44. Power distributed to the rear propeller shaft 46 is transmitted via a rear-wheel-side differential gear 48 and left and right rear-wheel drive shafts 50 to left and right rear wheels 52. The rear wheels 52 are main driving wheels that act as driving wheels in both the cases of two-wheel drive (2WD) running and four-wheel drive (4WD) running. The front wheels 44 are sub-driving wheels that act as driven wheels during 2WD running and that act as driving wheels DW during 4WD running. The engine 32 is an internal combustion engine such as a gasoline engine or a diesel engine and is used as a power source for running. In the engine 32, engine control equipment not shown having a throttle actuator, a fuel injector, an ignitor, etc. is controlled by the in-vehicle control device 130 so that an engine torque $T_e$ as an output torque of the engine 32 is controlled. In this manner, the vehicle 30 comprises a drive device 54 that includes the engine 32, the power transmission device 34 for HEV, the transfer 36, the front propeller shaft 38, the front-wheel-side differential gear the front-wheel drive shafts 42, the front wheels 44, the rear propeller shaft 46, the rear-wheel-side differential gear 48, the rear-wheel drive shafts 50, the rear wheels 52, etc.

Figure 3:
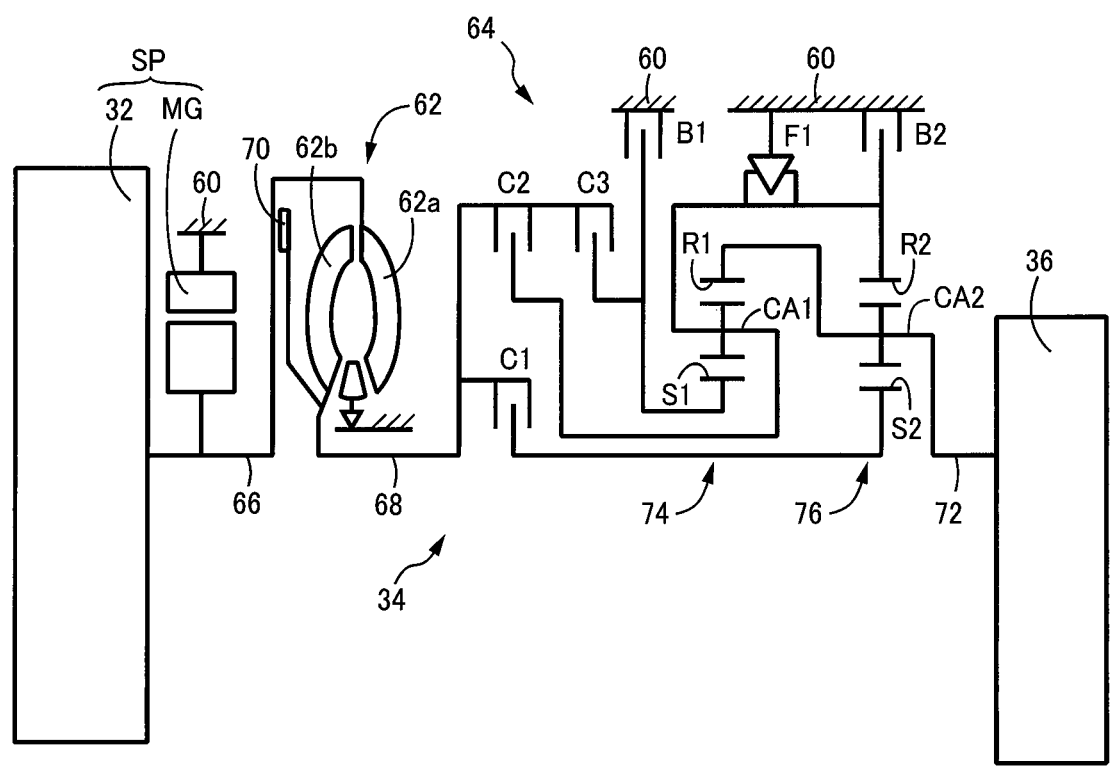
FIG. 3 is a skeleton diagram explaining a specific example of a power transmission device for HEV.

FIG. 3 is a skeleton diagram explaining a specific example of the power transmission device 34 for HEV In FIG. 3, the power transmission device 34 for REV includes: a rotator MG arranged within a transmission case 60 as a non-rotating member attached to a vehicle body; and a shift portion 64 coupled via a torque converter 62 to the rotator MG and the engine 32. The power transmission device 34 for HEV includes an MG coupling shaft 66. These rotator MG, torque converter 62, and the shift portion 64 are each configured approximately symmetrically about a center line, but in the skeleton diagram of FIG. 3 the lower half with respect to the center line is omitted. Hereinafter, the transmission case 60 will be referred to as case 60.

The rotator MG is a motor generator, for example, a three-phase AC synchronous motor, having both an electric motor function to generate mechanical power from electric power and a generator function to generate electric power from mechanical power. In the rotator MG, MG torque $T_{mg}$ i.e. the torque of the rotator MG and MG rotation number $N_{mg}$ i.e. the rotation speed of the rotator MG are controlled by the in-vehicle control device 130. The rotator MG is coupled to the MG coupling shaft 66 in a power transmittable manner. That is, the rotator MG is coupled to the power transmission path between the engine 32 and the torque converter 62 in a power transmittable manner. The rotator MG is used as a power source SP for running, to generate power for running in place of the engine 32 or in addition to the engine 32. The rotator MG generates electric power by being regeneratively controlled to function as a generator when rotationally driven by power of the engine 32 or driven force input from the driving wheel DW side, and generates regenerative braking in the case of being coupled to the driving wheels DW. The rotator MG is coupled directly or via a damper not shown, etc. to a crankshaft of the engine 32. Between the rotator MG and the engine 32, there may be disposed an engine connection/disconnection clutch or the like for enabling/disabling the power transmission.

The torque converter 62 includes a pump impeller 62a coupled via the MG coupling shaft 66 to the rotator MG, and a turbine impeller 62b coupled to an input shaft 68 of the shift portion 64. The torque converter 62 includes an LU clutch 70 as a publicly known lockup clutch that couples the pump impellers 62a and 62b together.

The shift portion 64 intervenes on the power transmission path between the torque converter 62 and the transfer 36. An output shaft 72 of the shift portion 64 is coupled to the transfer 36. The shift portion 64 is an automatic transmission that transmits power of the power source SP to the driving wheels DW.

The shift portion 64 is a publicly known planetary gear type staged automatic transmission that includes plural sets of planetary gear drives consisting of e.g. a first planetary gear drive 74 and a second planetary gear drive 76, and a plurality of engagement devices including a one-way clutch F1, clutches C1 to C3, and brakes B1 and B2. Hereinafter, the clutches C1 to C3 and the brakes B1 and B2 are referred to simply as engagement devices CB, if not particularly distinguished.

The engagement devices CB are publicly known hydraulic friction engagement devices each including a multi-plate type or single-plate type clutch and brake pressed by a hydraulic actuator and a band brake acted on by the hydraulic actuator. In each of the engagement devices CB, the control state i.e. operation state such as engagement state or release state is switched by changing a CB torque $T_{cb}$ that is a torque capacitance thereof, through the control by the in-vehicle control device of a CB oil pressure $PR_{cb}$ that is an oil pressure on the engagement device CB supplied from an oil pressure control circuit not shown.

In the shift portion 64, rotating elements of the first planetary gear drive 74 and the second planetary gear drive 76 are partially coupled to each other or are coupled to the input shaft 68, the case 60, or the output shaft 72, directly or indirectly via the engagement devices CB and the one-way clutch F1. The rotating elements of the first planetary gear drive 74 are a sun gear S1, a carrier CA1, and a ring gear R1, while the rotating elements of the second planetary gear drive 76 are a sun gear S2, a carrier CA2, and a ring gear R2.

The shift portion 64 is a staged transmission in which a plurality of variable speed levels (referred to also as gear stages) GS each having a different variable speed ratio (referred to also as gear ratio) $\gamma$ (=input rotation number $N_i$/output rotation number $N_o$) are selectively formed when any engagement device of the engagement devices CB is engaged. In the shift portion 64, the gear stages GS formed in response to an accelerator operation of the driver (=operator), a vehicle velocity V, etc. are switched by the in-vehicle control device 130. The input rotation number $N_i$ is the rotation number of the input shaft 68 and is the input rotation number of the shift portion 64, the input rotation number $N_i$ being equal to a turbine rotation number $N_t$ that is the rotation number of a turbine shaft rotationally driven by the turbine impeller 62b. The output rotation number $N_o$ is the rotation number of the output shaft 72 and is the output rotation number of the shift portion 64.

In the shift portion 64, as shown in an actuation engagement table of FIG. 4 for example, the plurality of gear stages GS are formed that include forward four speeds of a first gear stage ("$1^{st}$" in the diagram) to a fourth gear stage ("$4^{th}$" in the diagram) and a reverse gear stage ("Rev" in the diagram). The first gear stage has a largest gear ratio $\gamma$, while higher gear stages GS on the fourth gear stage side capable of high velocity running have smaller gear ratios $\gamma$. The actuation engagement table of FIG. 4 is a table putting together the relationships between the gear stages GS and the control states of the engagement devices CB. In FIG. 4, "○" represents the engaged state, parenthesized "(○)" represents the engaged state during coast downshifting of the shift portion 64, and blank represents the released state. When a gear stage GS is formed in the shift portion 64, the shift portion 64 enters the state enabling power transmission, i.e., the power transmittable state. The neutral state ("N" in the diagram) of the shift portion 64 is the state where the shift portion 64 cannot transmit power, i.e., the state disabling power transmission, and is implemented, for example, by cutting off the power transmission in the shift portion 64 with all the engagement devices CB released.

Referring back to FIG. 2, the transfer 36 includes, for example: a sub transmission that shifts in two stages, high (transfer Hi) and low (transfer Lo), rotation transmitted from the output shaft 72 of the shift portion 64; a distribution mechanism that distributes, at a predetermined distribution ratio, torque output from the sub transmission to the front propeller shaft 38 and the rear propeller shaft 46; a differential lock device that restricts differential rotation between the front propeller shaft 38 and the rear propeller shaft 46; and a 2WD/4WD switching device that switches the drive mode between the two-wheel drive driving only the rear wheels 52 and the four-wheel drive driving all of the wheels (front wheels 44 and rear wheels 52). A high/low switch of the sub transmission, the differential lock device, and the 2WD/4WD switching device are electrically controlled by the in-vehicle control device 130. The transfer 36 may be of a type capable of electrically controlling the torque distribution ratio between the front propeller shaft 38 and the rear propeller shaft 46.

The vehicle 30 further includes an automatic braking system 80 in relation to autocruise running. The automatic braking system 80 electrically controls braking force i.e. brake oil pressure of wheel brakes 82fl, 82fr, 82rl, and 82rr disposed on the front wheels 44 and the rear wheels 52, respectively, in accordance with commands from the in-vehicle control device 130. Hereinafter, the wheel brakes 82*fl*, 82*fr*, 82*rl*, and 82*rr* are referred to simply as wheel brakes 82, if not particularly distinguished. By stepping on a brake pedal not shown, brake oil pressure is supplied via a brake master cylinder to the wheel brakes 82, so that the wheel brakes 82 mechanically generate braking force corresponding to the brake oil pressure i.e. brake operating force.

The vehicle 30 includes the in-vehicle control device 130 as a control device that executes various controls. The in-vehicle control device 130 is configured including, as necessary, a plurality of electronic control devices for engine control, for MG control, for oil pressure control, etc.

The in-vehicle control device 130 is fed with various signals, etc. that are respectively based on detection values of corresponding sensors, etc. disposed in the vehicle 30. The various signals, etc. include signals indicative of, for example, an engine rotation number $N_e$ i.e. the rotation speed of the engine 32, the turbine rotation number $N_t$ equal to the input rotation number the output rotation number $N_o$ corresponding to the vehicle velocity V, the MG rotation number $N_{mg}$, an accelerator opening $\theta_{acc}$ that is the amount of operation of an accelerator operating member such as an accelerator pedal and that indicates the amount of output demanded by the driver, a throttle valve opening $\theta_{th}$ i.e. the opening degree of an electronic throttle valve, a road surface gradient $\Phi$, a longitudinal acceleration $G_a$ and a lateral acceleration $G_b$ of the vehicle 30, the gear stage GS of the shift portion 64, an intervehicle distance $D_{is}$ to a preceding vehicle, autocruise setting information $A_{crui}$, and platoon participation information $C_{ara}$. The corresponding sensors include, for example, an engine rotation number sensor 90, a turbine rotation number sensor 92, an output rotation number sensor 94, an MG rotation number sensor 96, an accelerator opening sensor 98, a throttle valve opening sensor 100, a road surface gradient sensor 102, an acceleration sensor 104, a gear stage detector 106, an intervehicle distance sensor 108 such as a millimeter wave radar, an autocruise setting device 110, and a platoon participation device 112. The gear stage detector 106 can detect a gear stage GS from e.g. the control states of the engagement devices CB of the shift portion 64, but may identify the gear stage GS by calculating the gear ratio $\gamma$ from the input rotation number $N_i$ and the output rotation number $N_o$.

The autocruise setting device 110 is a device that selects autocruise running performing constant-velocity running and follow-up running, as automatic driving automatically controlling the power source SP, so as to run in a previously defined target running state without needing the driver's acceleration/deceleration operation. That is, the vehicle 30 is capable of the autocruise running automatically controlling the engine 32 and the rotator MG in accordance with the target vehicle velocity $V_t$, etc., as well as manual driving in which the engine 32 and the rotator MG are controlled according to the driver's acceleration/deceleration operations using the accelerator pedal or the like. The autocruise setting device 110 is a device not only selecting the autocruise running but also setting the target vehicle velocity $V_t$, increasing/decreasing the target vehicle velocity $V_t$, and setting a target intervehicle distance $D_t$ during follow-up running that runs following a preceding vehicle. The autocruise setting device 110 is disposed on a steering wheel for example, to receive the target vehicle velocity $V_t$, the target intervehicle distance $D_t$, etc. entered as autocruise setting information $A_{crui}$ by the driver.

The platoon participation device 112 is a device operated when joining a platoon and running as the lead vehicle $12_{le}$ or the follow-up vehicle $12_{fo}$, and receives information of, for example, whether to join as the lead vehicle $12_{le}$, whether to join as the follow-up vehicle $12_{fo}$, and the order of running in the case of joining as the follow-up vehicle $12_{fo}$, that are entered as the platoon participation information $C_{ara}$ by the driver. The driver may enter, as the platoon participation information $C_{ara}$, transmission information containing e.g. the identification Nos. by which the vehicles 30 can be individually identified and the number of the gear stages of the shift portion 64 mounted. However, the entry is unnecessary in the case where those pieces of platoon participation information are previously registered in the in-vehicle control device 130 by initial setting or the like. In this embodiment, another vehicle mounted with a continuously variable transmission or a manual transmission, different from the vehicle 30, can also join a platoon as the platoon participating vehicle 12, with transmission information on the continuously variable transmission or the manual transmission also being set as the platoon participation information $C_{ara}$ in an in-vehicle control device of the vehicle linked with the server 20. The platoon participation device 112 is configured using, for example, a touch panel capable of touch input, but input may be made by using a terminal such as a smartphone owned by the driver. Platoon implementation information may be previously determined and set in the server 20 by a platoon manager, etc. so that the platoon implementation information is conveyed from the server 20 to target platoon participating vehicles 12 or their drivers, etc. The platoon implementation information includes e.g. date and time of platooning, information on a plurality of platoon participating vehicles 12 that join a platoon, information on whether to be the lead vehicle $12_{le}$ or the follow-up vehicle $12_{fo}$, and information on the order of running of the follow-up vehicles $12_{fo}$.

The in-vehicle control device 130 issues various command signals for controlling the devices (e.g. the engine 32, the rotator MG, the shift portion 64, the transfer 36, and the automatic braking system 80) disposed in the vehicle 30. The various command signals include, for example, an engine control command signal $S_e$ for controlling the engine 32, an MG control command signal $S_{mg}$ for controlling the rotator MG, a shift control command signal $S_{sh}$ for switching the gear stage GS of the shift portion 64, a transfer control command signal $S_{tf}$ for switching the power transmission state of the transfer 36, and an automatic braking control command signal $S_{br}$ for controlling the automatic braking system 80.

The in-vehicle control device 130 sends/receives various pieces of information I via the radio communication R to/from the server 20. For example, the in-vehicle control device 130 receives control information $I_c$ from the server 20 and sends vehicle information $I_v$ to the server 20. The control information $I_c$ includes, for example: information of a platooning flag i.e. a signal representing that platooning is in execution; the platoon implementation information; information of a permissible output range of a driving torque $T_r$ set during execution of platooning; restriction information of a tip-in torque rate described later, etc. The vehicle information $I_v$ includes, for example: vehicle identification information identifying each of the platoon participating vehicles 12; information of the running order inclusive of the lead vehicle $12_{le}$; transmission information on the type, the number of gear stages, etc. of the shift portion 64 mounted thereon; information of an outputtable range of the driving torque $T_r$; information of the tip-in torque rate described later, etc. The in-vehicle control device 130 may send/receive various pieces of information I interchanged between it and the server 20, via the radio communication R, to/from another platoon participating vehicle 12 different from the vehicle 30. A nonvolatile memory or the like for example disposed in the in-vehicle control device 130 may store information of vehicle specifications such as output characteristics of the engine 32 and output characteristics of the rotator MG.

To implement various controls in the vehicle 30, the in-vehicle control device 130 functionally includes a power source control portion 132 as power source control means, a transmission control portion 134 as transmission control means, an autocruise control portion 136 as autocruise control means, and a platooning control portion 138 as platooning control means.

The power source control portion 132 is a hybrid control portion as hybrid control means that works the engine 32 and the rotator MG in a cooperative manner to execute hybrid drive control, etc. The power source control portion 132 applies the accelerator opening $\theta_{acc}$ and the vehicle velocity V to a drive demand amount map for example, to calculate the driver's drive demand amount for the vehicle 30. The drive demand amount map represents previously defined relationships i.e. relationships found experimentally or by design in advance for storage therein. The drive demand amount is a demand value for the drive amount output from the vehicle 30. The drive amount is, for example, a driving force $F_r$, the driving torque $T_r$, etc. of the driving wheels DW, and the drive demand amount is, for example, a demanded driving force $F_{rdem}$, a demanded driving torque $T_{rdem}$, etc. of the driving wheels DW. Considering the power transmission losses, the accessory loads, the gear ratio $\gamma$ of the shift portion 64, etc., the power source control portion 132 issues the engine control command signal $S_e$ controlling the engine 32 and the MG control command signal $S_{mg}$ controlling the rotator MG, e.g., so as to obtain torque of the power source SP required to achieve the demanded driving torque $T_{rdem}$.

For example, on the power transmission path between the rotator MG and the engine 32, the power transmission device 34 for HEV may include an engine connection/disconnection clutch for cutting off power transmission therebetween. In the case where the engine connection/disconnection clutch is disposed, the power source control portion 132 enables battery electric vehicle (BEV) running, i.e., motor running in which a vehicle runs using only the rotator MG as the power source SP with the clutch released and with the engine 32 stopped. For example, in the case where the demanded driving torque $T_{rdem}$ can be achieved by only the output of the rotator MG, the power source control portion 132 establishes a BEV drive mode as the drive mode. The BEV drive mode is an electromotive drive mode that allows BEV running (=electromotive running). On the other hand, in the case where the demanded driving torque $T_{rdem}$ cannot be achieved unless using at least the output of the engine 32, the power source control portion 132 establishes an engine drive mode i.e. an HEV drive mode as the drive mode. The HEV drive mode is a hybrid drive mode enabling hybrid running (=HEV running) i.e. engine running in which a vehicle runs using at least the engine 32 as the power source SP when the engine connection/disconnection clutch is engaged. On the other hand, even though the demanded driving torque $T_{rdem}$ can be achieved by only the output of the rotator MG, if the engine 32, etc. needs to be warmed up, the power source control portion 132 establishes the HEV drive mode as the drive mode.

At the time when the demanded driving torque $T_{rdem}$ is increased, the driving torque $T_r$ may be switched from negative torque where the vehicle 30 is in the driven state to positive torque where the vehicle 30 is in the driving state. In this case, a tooth strike occurs due to reversal of the direction in which backlash between parts making up a power transmitting device disposed on the power transmission path between the engine 32 and the driving wheels DW, e.g., gear backlash is reduced. For this reason, occurrence of sudden backlash reduction may cause a so-called tip-in shock that is a backlash reduction shock due to the tooth strike. The power transmitting device is composed of the power transmission device 34 for HEV, the transfer 36, the rear propeller shaft 46, the rear-wheel-side differential gear 48, the rear-wheel drive shafts 50, etc. The driving state of the vehicle 30 is a state where the driving wheels DW are rotated by torque output from the power source SP. The driven state of the vehicle 30 is a state where the rotating members, etc. of the power transmitting device are rotated by torque input from the driving wheels DW.

Figure 5:
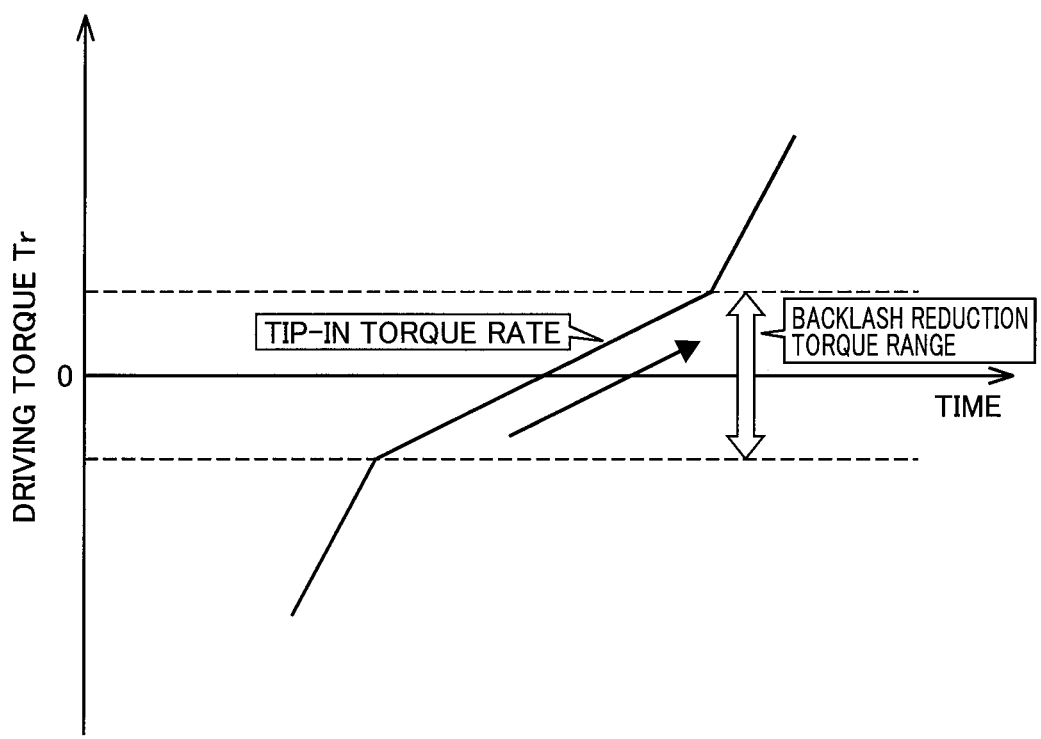
FIG. 5 is a diagram showing an example of a tip-in torque rate.

The power source control portion 132 has a control function of suppressing the tip-in shock by suppressing sudden backlash reduction when the backlash reduction direction is reversed. Specifically, in the case where the demanded driving torque $T_{rdem}$ is increased from negative torque to positive torque, the power source control portion 132 controls the engine 32 and the rotator MG so that the driving torque $T_r$ within a backlash reduction torque range is a gradually changing torque with a small ascending gradient value, as compared with the outside of the backlash reduction torque range, as shown in FIG. 5. The gradually changing torque is a previously defined driving torque $T_r$ for suppressing the sudden backlash reduction occurring when the backlash reduction direction is reversed. The small ascending gradient value of the gradually changing torque is an upper limit value of the change rate of the driving torque $T_r$ restricted when the drive device 54 of the vehicle 30 switches from the driven state to the driving state. In this embodiment, the upper limit is referred to as the tip-in torque rate as a drive/driven state switching rate. FIG. 5 is a diagram showing an example of the tip-in torque rate. In FIG. 5, the backlash reduction torque range is a previously defined predetermined torque range of the driving torque $T_r$ where the backlash reduction direction in the power transmitting device is reversed when the driving torque $T_r$ is changed from negative torque to positive torque. In other words, the backlash reduction torque range is a predetermined torque range of the driving torque $T_r$ where sudden backlash reduction needs to be suppressed, the predetermined torque range having a rattle point where the driving torque $T_r$ is zero and a range of the driving torque $T_r$ in the vicinity of the rattle point. The ascending gradient of the driving torque $T_r$ on the outside of the backlash reduction torque range is set by a previously defined upper limit value e.g. at the time of rising toward an ultimate torque of the demanded driving torque $T_{rdem}$ or at the time of approaching the ultimate torque.

Figure 6:
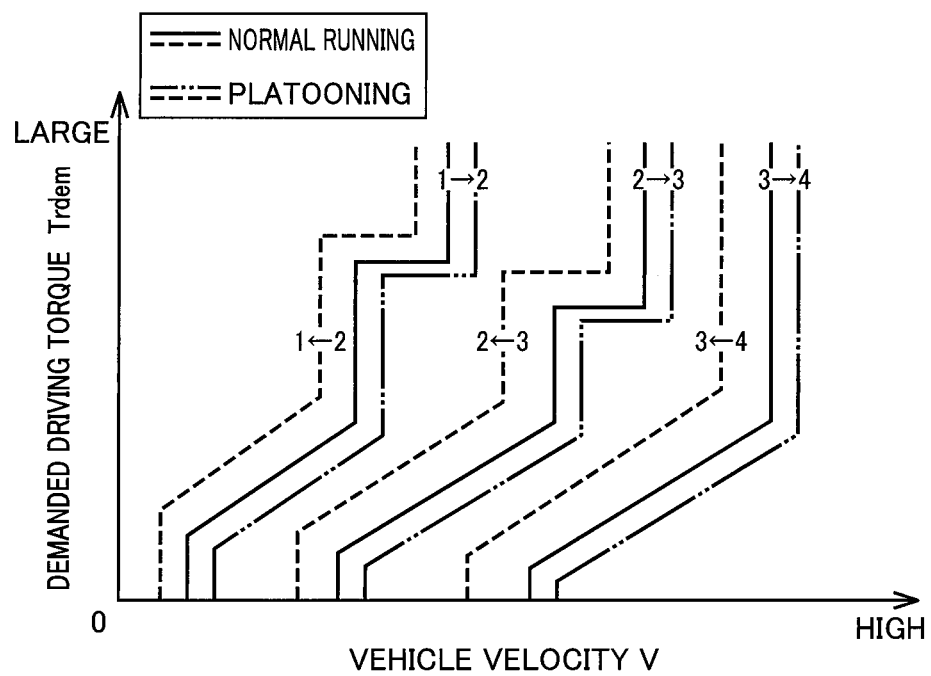
FIG. 6 is a diagram explaining an example of a shift map used in shifting control for the shift portion of FIG. 3.

The transmission control portion 134 determines shifting of the shift portion 64 e.g. by using a shift map representing previously defined relationships, and, as needed, issues a shift control command signal $S_{sh}$ for executing shift control of the shift portion 64. FIG. 6 shows an example of the shift map in the case of including the 4-speed transmission of FIG. 3 as the shift portion 64. The shift map of FIG. 6 represents predetermined relationships having shift lines for determining shifting of the shift portion 64 on two-dimensional coordinates with the vehicle velocity V and the demanded driving torque $T_{rdem}$ as variables for example. The shift lines include upshift lines for determining upshifting and downshift lines for determining downshifting. In FIG. 6, solid lines and chain double-dotted lines are the upshift lines, while broken lines are the downshift lines. The upshift lines indicated by chain double-dotted lines are upshift lines set during platooning that will be described later. Numerals "1" to "4" in the diagram denote the first to fourth gear stages, respectively. In the shift map of FIG. 6, according as the vehicle velocity V goes higher or according as the demanded driving torque $T_{rdem}$ goes lower, the gear ratio γ becomes smaller providing a high-velocity-side gear stage GS, whereas according as the vehicle velocity V goes lower or according as the demanded driving torque $T_{rdem}$ goes higher, the gear ratio γ becomes larger, so that a low-velocity-side gear stage GS is formed. In the shift map of FIG. 6, the vehicle velocity V may be substituted with e.g. the output rotation number $N_o$, while the demanded driving torque $T_{rdem}$ may be substituted with e.g. the demanded driving force $F_{rdem}$, the accelerator opening $θ_{acc}$, or the throttle valve opening $θ_{th}$.

The autocruise control portion 136 executes the autocruise running as the automatic driving. The autocruise running enables autonomous running without needing the driver's acceleration/deceleration operation. The autocruise control portion 136 executes constant-velocity running control for constant-velocity running at the target vehicle velocity $V_t$ set by the autocruise setting device 110 and follow-up running control for follow-up running keeping the target intervehicle distance $D_t$ set by the autocruise setting device 110. In the constant-velocity running control, the autocruise control portion 136 calculates a demanded driving torque $T_{rdem}$ necessary for running at the target vehicle velocity $V_t$, and, considering the power transmission losses, the accessory loads, the gear ratio γ of the shift portion 64, etc., issues the engine control command signal $S_e$ controlling the engine 32 and the MG control command signal $S_{mg}$ controlling the rotator MG, so as to obtain torque of the power source SP required to achieve the demanded driving torque $T_{rdem}$. In this case, the demanded driving torque $T_{rdem}$ is found by feedback control, feedforward control, or the like, based on e.g. a difference between the target vehicle velocity $V_t$ and the actual vehicle velocity V. On the other hand, in the follow-up running control for follow-up running keeping the target intervehicle distance $D_t$ from the preceding vehicle, the autocruise control portion 136 figures out a demanded driving torque $T_{rdem}$ necessary for follow-up running with the intervehicle distance $D_{is}$ equal to the target intervehicle distance $D_t$ and controls the engine torque $T_e$ and the MG torque so as to obtain the demanded driving torque $T_{rdem}$. The target intervehicle distance $D_t$ is variably set depending on e.g. the vehicle velocity V. In the case where the demanded driving torque $T_{rdem}$ is negative (minus) such as when the preceding vehicle decelerates, engine braking or regenerative braking by the rotator MG is generated, or if necessary, the braking is combined with braking force of the wheel brake 82 controlled by the automatic braking system 80, so that negative demanded driving torque $T_{rdem}$ can be obtained. Also during this autocruise running, the transmission control portion 134 executes shift control for switching the gear stage GS of the shift portion 64 in accordance with the shift conditions of e.g. the shift map of FIG. 6.

The platooning control portion 138 is involved in platooning control when the vehicle 30 joins platooning as the platoon participating vehicle 12. For example, the platooning control portion 138 sends the platoon participation information $C_{ara}$ to the server 20 to allow the vehicle 30 to join the platoon and perform autocruise running by the autocruise control portion 136. In the case of joining the platooning as the follow-up vehicle $12_{fo}$, the platooning control portion 138 performs follow-up running control for the follow-up running keeping a predetermined intervehicle distance $D_{is}$, e.g., target intervehicle distance $D_t$ from the preceding vehicle. In the case where the vehicle 30 is capable of unmanned running or running by automatic driving enabling autonomous running without needing the driver's acceleration/deceleration operation and steering operation, the platooning control portion 138 may allow the vehicle 30 to join the platooning with unmanned running or with running by automatic driving.

The server 20 functionally includes a platoon management control portion 22 as platoon management control means. The platoon management control portion 22 determines whether platooning is in execution. For example, the platoon management control portion 22 determines whether platooning is in execution, based on various pieces of information I interchanged between it and the platoon participating vehicles 12. If determined that platooning is in execution, the platoon management control portion 22 acquires vehicle information $I_v$ needed for platooning management, drive amount management, etc. from each of the platoon participating vehicles 12 and sends control information $I_c$ needed for platooning control, drive amount control, etc. to each of the platoon participating vehicles 12.

By the way, in the case where each of the platoon participating vehicles 12 has a different change characteristic in driving torque $T_r$, the predetermined intervehicle distance $D_{is}$ may not be kept during execution of platooning. For example, in the case where there occurs a need to change the driving torque $T_r$ during the running on an uphill road or the like, each of the platoon participating vehicles 12 makes a difference in vehicle velocity V due to differences between the platoon participating vehicles 12 in responsiveness of the driving torque $T_r$ and in outputtable driving torque $T_r$ of the current gear stage GS of the shift portion 64, whereupon the intervehicle distance $D_{is}$ varies, with the result that it may become impossible to keep the predetermined intervehicle distance $D_{is}$.

Thus, the vehicle control device 150 functionally includes a control portion 152 that sets the change characteristic of the driving torque $T_r$ in the platoon participating vehicle 12 so that change of the driving torque $T_r$ relative to change of the demanded driving torque $T_{rdem}$ lies within a predetermined range during execution of platooning. The control portion 152 includes for example: the platoon management control portion 22 disposed in the server 20; and the power source control portion 132, the transmission control portion 134, the autocruise control portion 136, and the platooning control portion 138, disposed in the in-vehicle control device 130.

In the vehicle 30, the outputtable range of the driving torque $T_r$ differs for each of the gear stages GS. If the shift portion 64 is not shifted in response to a change of the demanded driving torque $T_{rdem}$, the vehicle control device 150 can change the driving torque $T_r$ within the outputtable range of the driving torque $T_r$ at the current gear stage GS. Therefore, if each of the platoon participating vehicles 12 has a different outputtable range of the driving torque $T_r$, when changing the driving torque $T_r$ in response to the change of the demanded driving torque $T_{rdem}$, the responsiveness of the driving torque $T_r$ may differ or the need to shift the shift portion 64 may occur. To deal with this, the vehicle control device 150 matches permissible output ranges of the driving torque $T_r$ in the platoon participating vehicles 12, to thereby suppress the occurrence of difference in the vehicle velocity V between the platoon participating vehicles 12. That is, the control portion 152 sets, as a change characteristic of the driving torque $T_r$, the permissible output range of the driving torque $T_r$ with the current gear stage GS of the shift portion 64 remaining kept in each of the platoon participating vehicles 12. "With the current gear stage GS of the shift portion 64 remaining kept" means the state where the shift portion 64 is not shifted. The control portion 152 sets, as a restriction range $RNG_{tr}$ of the driving torque $T_r$ as the predetermined range, a narrowest range among ranges of the driving torque $T_r$ outputtable at the current gear stage GS of the shift portions 64 in the platoon participating vehicles 12. In the case where shifting of the shift portion 64 occurs in any of the platoon participating vehicles 12 due to e.g. increase in vehicle velocity V during execution of platooning, the restriction range $RNG_{tr}$ is set using the range of the driving torque $T_r$ outputtable in the gear stage GS after shifting, for the platoon participating vehicle 12 subjected to the shifting. For example, the outputtable range of the driving torque $T_r$ may be a range defined by a limit value by rating, i.e., a maximum output range in each of the platoon participating vehicles 12, or may be a range defined by NV (noise/vibration) performances or drivability at the current gear stage GS.

Figure 7:
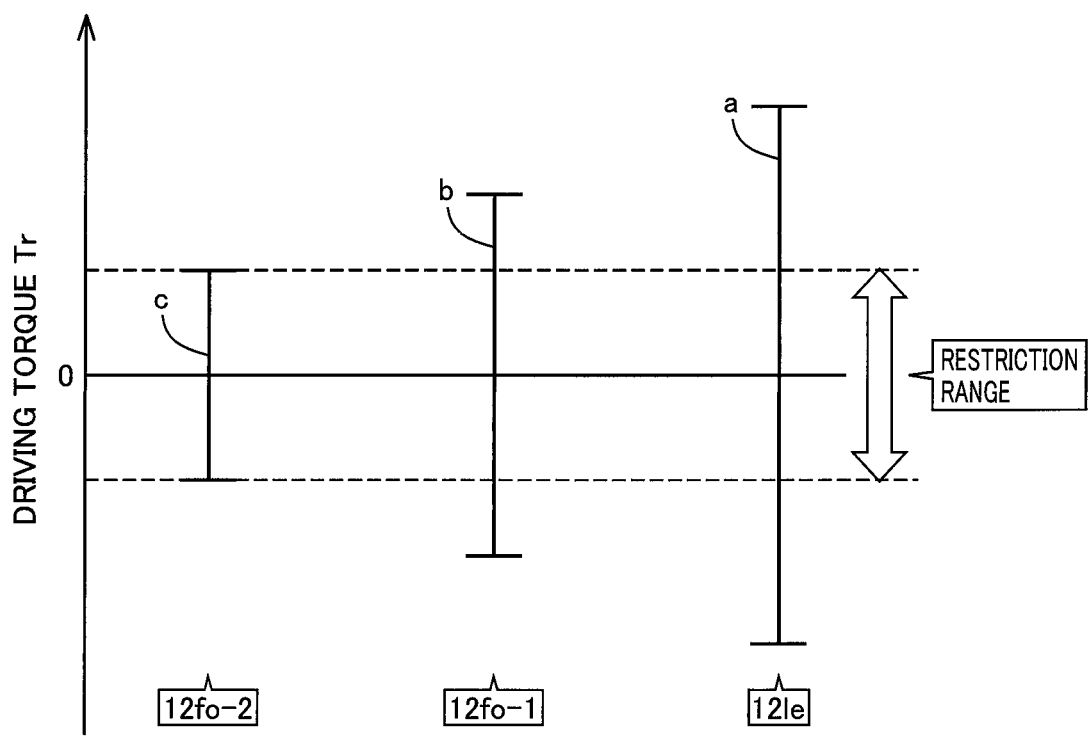
FIG. 7 is a diagram explaining an example of a driving torque restriction range that is set during execution of platooning.

FIG. 7 is a diagram explaining an example of the restriction range $RNG_{tr}$ of the driving torque $T_r$ that is set during execution of platooning. In FIG. 7, the range of a solid line "a" is a range of the driving torque $T_r$ outputtable at the current gear stage GS of the lead vehicle $12_{le}$; the range of a solid line "b" is a range of the driving torque $T_r$ outputtable at the current gear stage GS of the follow-up vehicle $12_{fo-1}$; and the range of a solid line "c" is a range of the driving torque $T_r$ outputtable at the current gear stage GS of the follow-up vehicle $12_{fo-2}$. Since the narrowest range is the outputtable range of the driving torque $T_r$ in the follow-up vehicle $12_{fo-2}$ of the platoon participating vehicles 12, this range is set as the restriction range $RNG_{tr}$ of the driving torque $T_r$.

Figure 8:
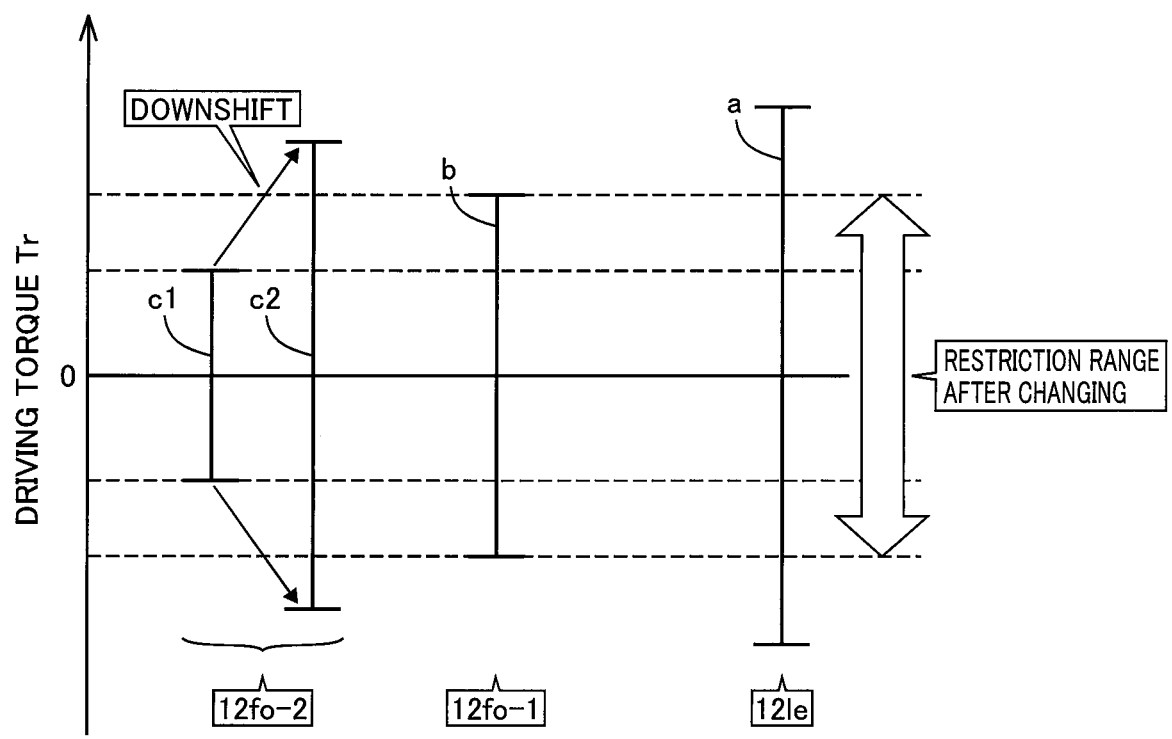
FIG. 8 is a diagram explaining an example of the driving torque restriction range that is set during execution of platooning, the diagram showing a case where shifting has occurred in any of platoon participating vehicles.

FIG. 8 is a diagram explaining an example of the restriction range $RNG_{tr}$ of the driving torque $T_r$ that is set during execution of platooning. FIG. 8 shows the case where shifting has occurred in any of the platoon participating vehicles 12. In FIG. 8, the range of a solid line "a" is the same as that of the solid line "a" of FIG. 7; the range of a solid line "b" is the same as that of the solid line "b" of FIG. 7; and the range of a solid line "c1" is the same as that of the solid line "c" of FIG. 7. The range of a solid line "c2" is a range of the driving torque $T_r$ outputtable in a gear stage after downshifting of the follow-up vehicle $12_{fo-2}$ in the case where the shift portion 64 has been downshifted due to e.g. increase in the vehicle velocity V in the follow-up vehicle $12_{fo-2}$. Since after downshifting in the follow-up vehicle $12_{fo-2}$, the narrowest range turns to the outputtable range of the driving torque $T_r$ in the follow-up vehicle $12_{fo-1}$ of the platoon participating vehicles 12, this range is set as the restriction range $RNG_{tr}$ after changing of the driving torque $T_r$.

As a different point of view from the outputtable range of the driving torque $T_r$, in the vehicle 30, the change rate of the driving torque $T_r$ is restricted by the tip-in torque rate (see FIG. 5) when the drive device 54 switches from driven state to the driving state. Hence, if the tip-in torque rate differs in each of the participating vehicles 12, the responsiveness of the driving torque $T_r$ differs upon switching from the driven state to the driving state. To deal with this, the vehicle control device 150 matches the tip-in torque rates in the platoon participating vehicles 12, to thereby restrain difference in the vehicle velocity V from occurring among the platoon participating vehicles 12. That is, the control portion 152 sets, as a change characteristic of the driving torque $T_r$, the tip-in torque rate in each of the platoon participating vehicles 12. If the tip-in torque rates are matched at a relatively high value when matched in the platoon participating vehicles 12, any of the platoon participating vehicles 12 may possibly be subjected to increased tip-in shock. The control portion 152 sets a lowest value of the tip-in torque rates of the platoon participating vehicles 12 as a restriction value $VAL_{dtr}$ of the change rate of the driving torque $T_r$ that is the predetermined range.

Since as described above, the outputtable range of the driving torque $T_r$ differs for each of the gear stages GS of the shift portion 64, the outputtable range is changed depending on the shifting of the shift portion 64. Therefore, to improve the control degree of freedom of the driving torque $T_r$ for the change of the demanded driving torque $T_{rdem}$, it is desirable to properly set a shift schedule i.e. shift timing in the stepped shifting of the shift portion 64. The control degree of freedom of the driving torque $T_r$ is not the restriction range $RNG_{tr}$ of the driving torque $T_r$, but is e.g. the range of the driving torque $T_r$ that can be controlled to secure the driving torque $T_r$ required in the current platooning. Thus, the control portion 152 sets the shift schedule in the stepped shifting of the shift portion 64 in each of the platoon participating vehicles 12 so that the outputtable range of the driving torque $T_r$ is easily maintained. To easily maintain the outputtable range of the driving torque $T_r$, it is preferred that the shift portion 64 be hard to be shifted. During execution of platooning, the control portion 152 sets the shift schedule of the shift portion 64 rendering stepped shifting of the shift portion 64 difficult as compared with the time of non-execution of platooning. The low-vehicle-velocity-side gear stages GS have a wider outputtable range of the driving torque $T_r$ as compared with the high-vehicle-velocity-side gear stages GS. That is, if it is difficult to upshift the shift portion 64 after downshifting thereof, the outputtable range of the driving torque $T_r$ is easy to become wide. Hence, "rendering stepped shifting of the shift portion 64 difficult" means e.g. rendering upshifting of the shift portion 64 difficult.

Referring back to FIG. 6, upshift lines indicated by solid lines and downshift lines indicated by broken lines are normal running shift lines i.e. shift lines set at the time of normal running during which platooning is not executed. On the other hand, upshift lines indicated by chain double-dotted lines are upshift lines set at the time of platooning. Downshift lines upon platooning are the same as those upon normal running. That is, the downshift lines indicated by the broken lines are set also at the time of platooning. The upshift lines indicated by the chain double-dotted lines and the downshift lines indicated by the broken lines are platooning shift lines i.e. shift lines set at the time of platooning. The upshift lines indicated by the chain double-dotted lines are changed so that the shift portion 64 is hard to be shifted, from the upshift lines indicated by the solid lines. In other words, the upshift lines indicated by the chain double-dotted lines are changed toward the high-vehicle-velocity side and the low-driving-torque side, from the upshift lines indicated by the solid lines. This widens the outputtable range of the driving torque $T_r$, achieving improved control degree of freedom in platooning.

Specifically, referring back to FIG. 2, the in-vehicle control device 130 determines whether platooning is in execution. For example, the in-vehicle control device 130 determines whether platooning is in execution, based on information of the platooning flag from the server 20. In the case where platooning is implemented by radio communication between the platoon participating vehicles 12, it may be determined whether platooning is in execution, based on information of a platooning flag from a platoon participating vehicle 12 different from the vehicle 30.

If determined that platooning is in execution, the in-vehicle control device 130 employs the platooning shift lines as shift lines used for shift control of the shift portion 64.

If determined that platooning is in execution, the in-vehicle control device 130 compares the outputtable range of the driving torque $T_r$ when the shift portion 64 is not shifted, with that of another vehicle of the platoon participating vehicles 12, based on the state of the vehicle. For example, the in-vehicle control device 130 determines whether the outputtable range of the driving torque $T_r$ of the vehicle at the current gear stage GS of the shift portion 64 is the narrowest range among those of the platoon participating vehicles 12. From another viewpoint, the in-vehicle control device 130 determines whether the outputtable range of the driving torque $T_r$ of the vehicle at the current gear stage GS of the shift portion 64 is a range narrower than the already set restriction range $RNG_{tr}$ of the driving torque $T_r$.

If determined that the outputtable range of the driving torque $T_r$ of the vehicle with the shift portion 64 not shifted is the narrowest range, the in-vehicle control device 130 newly sets this narrowest range as the restriction range $RNG_{tr}$ of the driving torque $T_r$. Instead of the in-vehicle control device 130, the server 20 may newly set this narrowest range as the restriction range $RNG_{tr}$ of the driving torque $T_r$.

If determined that the platooning is in execution, the in-vehicle control device 130 compares the tip-in torque rate of the vehicle with that of another vehicle of the platoon participating vehicles 12. For example, the in-vehicle control device 130 determines whether the tip-in torque rate of the vehicle is the lowest value among those of the platoon participating vehicles 12. From another viewpoint, the in-vehicle control device 130 determines whether the tip-in torque rate of the vehicle is a value lower than the already set restriction value $VAL_{dtr}$ of the change rate of the driving torque $T_r$.

If determined that the tip-in torque rate of the vehicle is the lowest value, the in-vehicle control device 130 newly sets this lowest value as the restriction value $VAL_{dtr}$ of the change rate of the driving torque $T_r$. Instead of the in-vehicle control device 130, the server 20 may newly set this lowest value as the restriction value $VAL_{dtr}$ of the change rate of the driving torque $T_r$.

Figure 9:
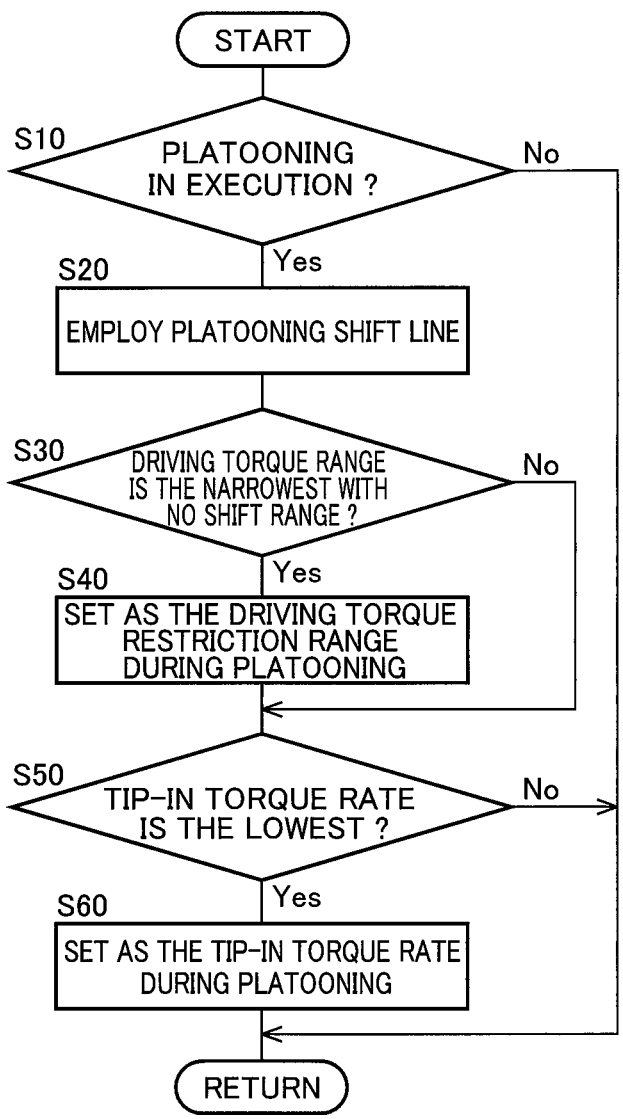
FIG. 9 is a flowchart explaining a principal part of control action of a vehicle control device, the flowchart explaining control action for suppressing change of intervehicle distance arising from difference in drive amount change characteristic between the platoon participating vehicles.

FIG. 9 is a flowchart explaining a principal part of control action of the vehicle control device 150, the flowchart explaining control action for suppressing change of the intervehicle distance $D_{is}$ arising from difference in drive amount change characteristic between the platoon participating vehicles 12. This flow is executed iteratively.

In FIG. 9, steps of the flowchart correspond to the functions of the vehicle control device 150 e.g. the in-vehicle control device 130. At step (hereinafter, the term "step" will be omitted) S10, it is determined whether the platooning is in execution. If determination at S10 is negative, this routine is brought an end. If determination at S10 is affirmative, at S20, the platooning shift line is employed as the shift line for use in shift control of the shift portion 64. Then, at S30, it is determined whether the outputtable range of the driving torque $T_r$ with the shift portion 64 not shifted is the narrowest range among those of the platoon participating vehicles 12. If determination at S30 is affirmative, at S40, the range of the driving torque $T_r$ determined as the narrowest range at S30 is newly set as the restriction range $RNG_{tr}$ of the driving torque $T_r$. If determination at S30 is negative, at S50 next to S40, it is determined whether the tip-in torque rate is the lowest value among those of the platoon participating vehicles 12. If determination at S50 is negative, this routine comes to an end. If determination at S50 is affirmative, at S60, the tip-in torque rate determined as the lowest value at S50 is newly set as the restriction value $VAL_{dtr}$ of the change rate of the driving torque $T_r$.

As described above, according to this embodiment, during execution of platooning, the permissible output range of the driving torque $T_r$ with the current gear stage GS of the shift portion 64 kept is set as the change characteristic of the driving torque $T_r$ in each of the platoon participating vehicles 12 so that the change of the driving torque $T_r$ in response to the change of the demanded driving torque $T_{rdem}$ lies within the predetermined range, to thereby restrain difference in the vehicle velocity V from occurring among the platoon participating vehicles 12 when changing the driving torque $T_r$ in accordance with the change of the demanded driving torque $T_{rdem}$. It is also possible to suppress the change of the vehicle velocity V arising from shifting when changing the driving torque $T_r$ in accordance with the change of the demanded driving torque $T_{rdem}$, thereby properly restraining difference in the vehicle velocity V from occurring among the platoon participating vehicles 12. It is thus possible to suppress the change of the intervehicle distance $D_{is}$ caused by the difference in the change characteristic of the driving torque $T_r$ among the platoon participating vehicles 12.

According to this embodiment, the restriction range $RNG_{tr}$ of the driving torque $T_r$ as the predetermined range is the narrowest range among ranges of the driving torque $T_r$ outputtable at the current gear stage GS of the shift portions 64 in the platoon participating vehicles 12, consequently enabling proper suppression of change of the intervehicle distance $D_{is}$ attributable to difference in the change characteristic of the driving torque $T_r$ among the platoon participating vehicles 12.

According to this embodiment, the tip-in torque rate in each of the platoon participating vehicles 12 is set as the change characteristic of the driving torque $T_r$, consequently enabling suppression of variance of the tip-in torque rate among the platoon participating vehicles 12. This allows the occurrence of difference in the vehicle velocity V among the platoon participating vehicles 12 to be properly suppressed.

According to this embodiment, the lowest value of the tip-in torque rates in the platoon participating vehicles 12 is employed as the restriction value $VAL_{dtr}$ of the change rate of the driving torque $T_r$ as the predetermined range, consequently enabling proper suppression of change of the intervehicle distance $D_{is}$ attributable to difference in the change characteristic of the driving torque $T_r$ among the platoon participating vehicles 12.

According to this embodiment, during execution of platooning, the shift schedule in the stepped shifting of the shift portion 64 is set so that the outputtable range of driving torque $T_r$ is easily maintained, thus achieving improved control degree of freedom of the driving torque $T_r$ for the change of the demanded driving torque $T_{rdem}$. This leads to proper suppression of the occurrence of difference in the vehicle velocity V among the platoon participating vehicles 12.

According to this embodiment, during execution of platooning, the shift schedule of the shift portion 64 is set that renders stepped shifting of the shift portion 64 difficult as compared with the time of non-execution of platooning, with the result that it is possible to properly suppress the change of the vehicle velocity V attributable to shifting when changing the driving torque $T_r$ in accordance with change of the demanded driving torque $T_{rdem}$.

According to this embodiment, "renders stepped shifting of the shift portion 64 difficult" means rendering upshifting of the shift portion 64 difficult, whereupon it is possible to properly suppress the change of the vehicle velocity V attributable to shifting while maintaining the outputtable range of the driving torque $T_r$.

Although the embodiment of the present invention has hereinbefore been described in detail with reference to the drawings, the present invention is applicable also to other modes.

For example, it is natural that by executing control steps corresponding to the control portion 152 included in the vehicle control device 150, similar effects to those of the above embodiment be obtained also in a vehicle control method that implements vehicle control functions of controlling platooning of the platoon participating vehicles 12 similar to those of the vehicle control device 150.

Figure 10:
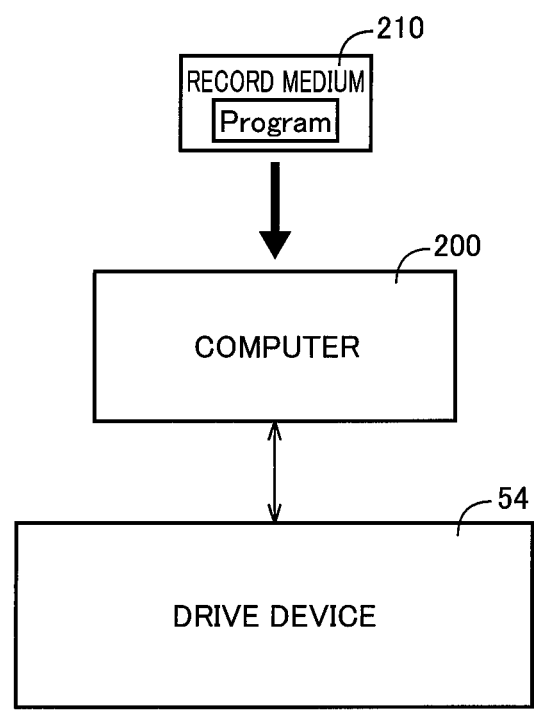
FIG. 10 is a diagram explaining an example of a program for causing a computer to implement a vehicle control function, and a computer-readable record medium recording the program, to which the present invention is applied.

The present invention is applicable also to a computer-readable record medium 210 recording a program $P_{rogram}$ for causing a computer 200 connected wiredly or wirelessly to the drive device 54, etc., as shown in FIG. 10 to implement vehicle control functions of controlling platooning of the platoon participating vehicles 12 similar to those of the vehicle control device 150. The record medium 210 is a medium capable of recording the program $P_{rogram}$, such as e.g. an optical disk, a hard disk drive, or another storage device, or a flush memory or another nonvolatile memory. In FIG. 10, the computer 200 is configured including a so-called microcomputer or the like similar to the vehicle control device 150 having e.g. the CPU, the RAM, the ROM, the I/O interface, etc. The computer 200 can read the program $P_{rogram}$ recorded in advance in the record medium 210, to execute the program $P_{rogram}$. That is, the present invention is applicable also to the computer-readable record medium 210 recording the program $P_{rogram}$ for causing the computer 200 to implement the vehicle control functions corresponding to the control portion 152 included in the vehicle control device 150. Naturally, this also ensures similar effects to those obtained in the above embodiment. Various modes causing the computer 200 to implement the program $P_{rogram}$ are present such as e.g. a mode in which the computer 200 executes the program $P_{rogram}$ stored in advance in the computer 200 and a mode in which the computer 200 downloads via communication the program $P_{rogram}$ stored in the server (which is also one type of the record medium 210), to execute the program $P_{rogram}$. Accordingly, the present invention is applicable also to the program $P_{rogram}$ for causing the computer 200 to implement the vehicle control functions corresponding to the control portion 152 included in the vehicle control device 150. Naturally, this also ensures similar effects to those obtained in the above embodiment.

In the above embodiment, the shift portion 64 as the stepped transmission has been exemplified to explain the function of setting the restriction range $RNG_{tr}$ of the driving torque $T_r$. The present invention is applicable also to the case where the shift portion 64 is a continuously variable transmission. In this case, the control portion 152 sets, as the change characteristic of the driving torque $T_r$, the permissible output range of the driving torque $T_r$ with the current gear ratio of the shift portion 64 kept in each of the platoon participating vehicles 12. The control portion 152 sets, as the restriction range $RNG_{tr}$ of the driving torque $T_r$ as the predetermined range, the narrowest range among ranges of the driving torque $T_r$ outputtable at the current gear ratio of the shift portions 64 in the platoon participating vehicles 12. If pseudo-stepped shifting is possible by changing the gear ratio stepwise in this continuously variable transmission, the control portion 152 can set the shift schedule in the stepped shifting of the shift portion 64 in each of the platoon participating vehicles 12 so that the outputtable range of the driving torque $T_r$ is easily maintained during execution of platooning. For example, the control portion 152 can set a platooning shift line.

Although in the above embodiment, the steps of the flowchart of FIG. 9 are executed by the in-vehicle control device 130 included in the vehicle control device 150, this mode is not limitative. For example, some or all of the steps of the flowchart of FIG. 9 may be executed by the server 20 included in the vehicle control device 150. The flowchart of FIG. 9 may be executed for the platoon participating vehicle 12 that has newly joined the platoon during execution of platooning.

In the above embodiment, the flowchart of FIG. 9 may be a flowchart where at least S30 and S40 are executed among S20, S30 and S40, and S50 and S60. That is, the vehicle control device 150 needs only to have at least the function of setting the restriction range $RNG_{tr}$ of the driving torque $T_r$, and the flowchart of FIG. 9 needs only to include at least S10, and S30 and S40. For example, the vehicle control device 150 having at least the function of setting the platooning shift line may be taken as one aspect of the present invention. In this case, the flowchart of FIG. 9 needs only to include at least S10 and S20. In this case, the shift schedule in the stepped shifting of the shift portion 64 can be regarded as the change characteristic of the driving torque $T_r$ in the platoon participating vehicle 12. This also ensures the effect of being capable of suppressing the change of the intervehicle distance $D_{is}$ attributable to difference in the change characteristic of the driving torque $T_r$ among the platoon participating vehicles 12. The vehicle control device 150 having at least the function of setting the restriction value $VAL_{dtr}$ of the change rate of the driving torque $T_r$ may be taken as one aspect of the present invention. In this case, the flowchart of FIG. 9 needs only to include at least S10, and S50 and S60. In this case, the vehicle 30 need not necessarily include the torque converter 62 and the shift portion 64. This also ensures the effect of being capable of suppressing the change of the intervehicle distance $D_{is}$ attributable to difference in the change characteristic of the driving torque $T_r$ among the platoon participating vehicles 12.

The above is a mere embodiment, and the present invention can be carried out in modes variously modified or improved based on the knowledge of those skilled in the art.

EXPLANATIONS OF LETTERS OR NUMERALS

12 platoon participating vehicle
12$_{ie}$ lead vehicle (platoon participating vehicle)
12$_{fo}$ (12$_{fo-1}$, 12$_{fo-2}$, 12$_{fo-n}$) follow-up vehicles (platoon participating vehicles)
20: server (vehicle control device)
30 vehicle (platoon participating vehicle)
32: engine (power source)
44: front wheel (driving wheel)
52: rear wheel (driving wheel)
54: drive device
64: shift portion (automatic transmission)
130: in-vehicle control device (vehicle control device)

150 vehicle control device
152 control portion
200: computer
DW: driving wheel
MG: rotator (power source)
R: radio communication
SP: power source
Program: program

What is claimed is:

1. A vehicle control device for controlling platooning of platoon participating vehicles by connecting the platoon participating vehicles to one another via radio communication, the platoon participating vehicles including a lead vehicle and follow-up vehicles that perform automatic follow-up running in line at a predetermined intervehicle distance from the lead vehicle, comprising:

a control portion that, during execution of the platooning, sets a permissible output range of a drive amount with a current gear ratio of an automatic transmission remaining kept, as a change characteristic of the drive amount in each of the platoon participating vehicles so that change of the drive amount in response to change of a drive demand amount lies within a predetermined range, the automatic transmission being included in each of the platoon participating vehicles to transmit power of a power source to driving wheels, wherein the control portion sets, as the change characteristic of the drive amount, an upper limit value of a change rate of the drive amount that is restricted when a drive device of each of the platoon participating vehicles switches from a driven state to a driving state.

2. The vehicle control device of claim 1, wherein
the control portion sets, as the predetermined range, a lowest value among upper limit values of the change rate of the drive amount in the platoon participating vehicles.

3. A vehicle control device for controlling platooning of platoon participating vehicles by connecting the platoon participating vehicles to one another via radio communication, the platoon participating vehicles including a lead vehicle and follow-up vehicles that perform automatic follow-up running in line at a predetermined intervehicle distance from the lead vehicle, comprising:

a control portion that, during execution of the platooning, sets a permissible output range of a drive amount with a current gear ratio of an automatic transmission remaining kept, as a change characteristic of the drive amount in each of the platoon participating vehicles so that change of the drive amount in response to change of a drive demand amount lies within a predetermined range, the automatic transmission being included in each of the platoon participating vehicles to transmit power of a power source to driving wheels, wherein during execution of the platooning, the control portion sets a shift schedule in stepped shifting of the automatic transmission so that the range of the drive amount outputtable is easily maintained.

4. The vehicle control device of claim 3, wherein
during execution of the platooning, the control portion sets a shift schedule rendering the stepped shifting of the automatic transmission difficult as compared with time of non-execution of the platooning.

5. The vehicle control device of claim 4, wherein
the rendering the stepped shifting difficult is rendering upshifting of the automatic transmission difficult.

* * * * *